(12) United States Patent
Hirth et al.

(10) Patent No.: US 9,797,530 B2
(45) Date of Patent: Oct. 24, 2017

(54) PROCESS FOR MANUFACTURING A BELLOWS AND/OR BELLOWS

(71) Applicant: BOA Balg- und Kompensatoren-Technologie GmbH, Stutensee (DE)

(72) Inventors: Klaus Hirth, Malsch (DE); Immo Gärtner, Karlsruhe (DE); Jürgen Telatinski, Stutensee (DE); Uwe Wild, Karlsbad (DE)

(73) Assignee: BOA BALG- UND KOMPENSATOREN-TECHNOLOGIE GMBH, Stutensee (DE)

( * ) Notice: Subject to any disclaimer, the term of this patent is extended or adjusted under 35 U.S.C. 154(b) by 544 days.

(21) Appl. No.: 14/247,715

(22) Filed: Apr. 8, 2014

(65) Prior Publication Data

US 2014/0299218 A1  Oct. 9, 2014

(30) Foreign Application Priority Data

Apr. 9, 2013  (DE) .................. 10 2013 006 009

(51) Int. Cl.

| | |
|---|---|
| *F16L 11/15* | (2006.01) |
| *C21D 8/10* | (2006.01) |
| *F16L 27/11* | (2006.01) |
| *F16L 51/02* | (2006.01) |
| *B21C 37/20* | (2006.01) |
| *C23C 8/22* | (2006.01) |
| *C23C 8/26* | (2006.01) |

(Continued)

(52) U.S. Cl.
CPC .............. *F16L 11/15* (2013.01); *B21C 37/20* (2013.01); *C21D 8/10* (2013.01); *C21D 8/105* (2013.01); *C21D 9/14* (2013.01); *C23C 8/22* (2013.01); *C23C 8/26* (2013.01); *C23C 8/32* (2013.01); *F16L 27/11* (2013.01); *F16L 51/025* (2013.01); *C21D 2211/001* (2013.01); *C21D 2221/00* (2013.01); *C21D 2221/10* (2013.01)

(58) Field of Classification Search
None
See application file for complete search history.

(56) References Cited

U.S. PATENT DOCUMENTS 6,631,542 B1 * 10/2003 Imai .................. B23P 15/00
148/228

FOREIGN PATENT DOCUMENTS

| EP | 1 985 388 B1 | 3/2010 |
|---|---|---|
| WO | 02/070 774 A1 | 9/2002 |

\* cited by examiner

*Primary Examiner* — Adam Krupicka
(74) *Attorney, Agent, or Firm* — McGlew and Tuttle, P.C.

(57) ABSTRACT

A process for manufacturing a bellows, made of austenitic high-grade steel with high compressive strength and fatigue strength, forms a single-layer or multilayer sleeve into a bellows with hydraulic forming. The pressure resistance and fatigue strength are improved by the bellows being cleaned after the forming and by the bellows being exposed to a surrounding area containing carbon and/or nitrogen atoms at temperatures between 100° C. and 400° C., preferably 200° C. to 320° C. With this a hardening of the bellows takes place by means of the diffusing in of carbon and/or nitrogen atoms. A bellows made of austenitic high-grade steel with one or more layers created in this manner has the edge layer hardened by the incorporation of carbon and/or nitrogen atoms up to a hardening depth of at least 5% of the wall thickness.

20 Claims, 4 Drawing Sheets

(51) Int. Cl.
*C23C 8/32* (2006.01)
*C21D 9/14* (2006.01)

PROCESS FOR MANUFACTURING A BELLOWS AND/OR BELLOWS

CROSS REFERENCE TO RELATED APPLICATIONS

This application claims the benefit of priority under 35 U.S.C. §119 of German Patent Application DE 10 2013 006 009.5 filed Apr. 9, 2013, the entire contents of which are incorporated herein by reference.

FIELD OF THE INVENTION

The present invention pertains to a process for manufacturing a bellows made of austenitic high-grade steel with high compressive strength and fatigue strength, wherein a single-layer or multilayer sleeve is formed into a bellows by means of hydraulic forming as well as to a bellows made of austenitic high-grade steel with one or more layers.

BACKGROUND OF THE INVENTION

Metal bellows are used for the hermetically sealed isolation of movements. For reasons of better formability and corrosion resistance, they usually consist of austenitic high-grade steels. The usual requirements for bellows concern the mobility, service life, spring stiffness and pressure resistance of the bellows. A movement or a combination of movements of a defined magnitude with a fixed minimal service life, i.e., with a certain number of load cycles, shall often be endured.

An elementary design criterion for metal bellows is the magnitude of the movements absorbed. This movement magnitude has direct effects on the required installation space of the corrugated bellows. Often, a large movement with a high number of load cycles with low installation space requirement shall be achieved.

A high corrugation height and a high number of bellows corrugations with as low a wall thickness as possible are advantageous for a high absorption of movements. The low wall thickness has an advantageous effect on the absorption of movements, provided the load of the metal bellows mostly takes place in a path-controlled manner, i.e., the absorption of movements is determined by the stimulating system. The absorbed movements are expressed as deflections in the bellows corrugations. The greater the wall thickness of the bellows is, the greater are the bending stresses generated.

However, the pressure resistance of the bellows also drops with decreasing wall thickness. Should a bellows have a pressure-resistant design, then this is limited in its mobility and its service life due to the necessary great wall thickness in a given installation space.

Finally, an as low as possible spring stiffness of the bellows is often required as well. As also for the service life, a small wall thickness of the bellows is decisive for a low spring stiffness of the bellows as well.

The often used austenitic high-grade steels, e.g., 1.4301, 1.4401, 1.4404, 1.4509, 1.4541, 1.4571, 1.4828 or nickel-based alloys, such as 2.4600, 2.4816 or 2.4856 and duplex steels, such as 1.4362 or 1.4462 are characterized by their excellent formability. On the other hand, their strength lies far below the strength that can be achieved with ferritic steels. The use of bellows made of austenitic high-grade steels is especially limited in terms of their compressive strength. If a high compressive strength shall be achieved, the wall thickness of the bellows must be high. This leads to marked drawbacks in the fatigue strength and stiffness of the bellows.

If very high pressure resistances shall be achieved, another problem arises: Metal bellows are usually manufactured by hydraulic forming by means of internal pressure. A pressure, which brings the starting material into the final state, is also suitable for deforming the finished product again later. That is, the pressure used for forming must always be greater than the later pressure, to which the finished bellows is exposed during operation.

For some applications, e.g., in injection nozzles, the required operating pressures are, however, very high. Modern diesel injection systems are designed for operating pressures of above 2,000 bar. Such pressures cannot up to now be achieved in bellows manufacturing.

To increase the pressure resistance of bellows, metal bellows made of a hardenable, usually ferritic steel are already manufactured according to the state of the art and then hardened and tempered after the manufacture. One drawback in the use of ferritic steels is the low elongation after fracture compared to austenitic steels. As a result of this, only a low corrugation height can be achieved at the bellows. A further exclusion criterion is the corrosion resistance required in many applications, which makes the use of austenitic steels necessary.

One possibility for increasing pressure resistance of bellows while maintaining controllable forming pressures shown in EP 1 985 388 B1 is the use of a material with two metastable states, one of which is soft and ductile, the other state is very hard and has high strength. The change in states for this is usually achieved by a special heat treatment. The steels used for this are, however, expensive to procure and process. In addition, the soft, ductile state is only present at high temperatures, which considerably complicates the forming process and makes it more expensive.

A further difficulty lies in the connection of the thus manufactured parts to the surrounding area. On the one hand, some of the kinds of steel described in EP 1 985 388 B1 cannot be welded easily or not at all; on the other hand, the metastable states achieved after the forming are carried out first after the welding of the bellows; this may lead to thermal distortion and impairment of the corrosion resistance at the connection parts.

An especially pressure-resistant bellows geometry with a corrugation height that is lower than the corrugation length is described in the cited publication in connection with the hardenable materials. However, such a geometry is highly unfavorable for the absorption of movements of the bellows. A comparatively long bellows and large installation space requirements resulting therefrom must be used here to achieve acceptable service lives in a given movement requirement. It is known to increase the surface quality of a metallic material by incorporating carbon and/or nitrogen atoms in a very thin surface layer of up to 35 μm in order to achieve especially an improved wear and scratch resistance.

SUMMARY OF THE INVENTION

A basic object of the present invention is to create a fatigue-endurable, pressure-resistant metal bellows made of an austenitic high-grade steel, which avoids the above-mentioned drawbacks in manufacturing costs and connection problems and offers advantages over a conventional bellows in pressure resistance and absorption of movements or fatigue strength.

This object is accomplished according to the present invention by a process of the type of this class, which is characterized in that the bellows is cleaned after the forming and in that the bellows is then exposed to a surrounding area containing carbon and/or nitrogen atoms at temperatures between 100° C. and 400° C., preferably between 200° and 320° C., with which a hardening of the bellows takes place due to the diffusing in of carbon and/or nitrogen atoms. In addition, to accomplish the object, the present invention provides, in a bellows of the type of this class, for carbon and/or nitrogen atoms to be incorporated in the bellows material in a hardening depth of at least 5% of the wall thickness.

Here, especially an improvement in the fatigue strength is brought about both due to the increase in the yield strength and due to the difference in the content of foreign atoms between the edge layer and the core, since compressive stresses form in the edge layer due to the incorporation of carbon or nitrogen atoms into the metal grid, consequently cause an increase in volume, while the core of the workpiece, into which few foreign atoms or none at all diffuse, maintains its size and opposes resistance to the expansion impulse of the edge layer, however.

In order to guarantee a high absorption of movement, metal bellows have a thin-wall design, so that a low hardening depth is sufficient for achieving the stated goals.

Hardening depth is the depth of the bellows wall, measured from a surface (inner or outer), which has a hardness increased by 5HV0.01 compared to the base metal. In case of a low wall thickness of a bellows, the hardening depth already makes up a considerable part of the wall thickness without further special measures. In that especially a displacement absorption of the bellows, but a pressure load as well, is for the most part expressed as a bending load, the greatest stresses are only obtained in the hardened area. As a result of this, the pressure resistance of a thin-walled bellows can be increased considerably by hardening the edge or an edge layer. Due to the increase in the yield strength, the compressive strength and fatigue strength of the bellows will thus be considerably high due to the hardening taking place on the outside.

Consequently, it is possible to design the bellows with an even thinner wall with identical pressure resistance. Due to the thinner-walled design, the service life or allowable absorption of movements of the bellows can be increased massively while maintaining the pressure resistance. On the other hand, the pressure resistance can be considerably high while retaining the service life requirement and the wall thickness.

Preferred embodiments of the process according to the present invention make provisions for the bellows to be exposed to the surrounding area containing carbon and/or nitrogen atoms for one to six days, preferably for three to six days, whereby especially the bellows is exposed to a molten salt containing carbon and/or nitrogen compounds, such as a molten salt consisting of potassium acetate and/or sodium acetate, or else the bellows is exposed to an inert gas atmosphere containing carbon and/or nitrogen, for example, an argon gas atmosphere. In a preferred variant, provisions are made for the bellows to be exposed to a surrounding area that contains carbon and/or nitrogen until carbon and/or nitrogen atoms have penetrated to a hardening depth of at least 5% of the wall thickness. Moreover, provisions may be made for either the bellows to be exposed to a surrounding area that contains carbon and/or nitrogen until carbon and/or nitrogen atoms have penetrated to a hardening depth of at least 10% of the wall thickness, but up to no more than 50 µm, or else for the bellows to be exposed to a surrounding area that contains carbon and/or nitrogen until carbon and/or nitrogen atoms have penetrated to a hardening depth of at least 25% of the wall thickness, but up to no more than 100 µm.

Preferred embodiments of a bellows according to the present invention are characterized in that the content of incorporated carbon and/or nitrogen atoms decreases from the outside of the wall of the bellows towards the interior of the wall and/or are characterized by a greater length of the bellows corrugations compared to the height of the bellows corrugations.

The properties of the finished bellows can be adjusted here via the wall thickness, hardening depth and surface hardness obtained. The selection of a material thickness, which makes possible a full hardening of the bellows wall, is especially advantageous for the pressure resistance. The foreign atoms are incorporated here over the entire material cross section. As a result of this, great pressure resistances can be achieved—the service life in case of repeated loading increases only slightly, or even decreases, however, compared to bellows of identical geometry and wall thickness. The reason for this is the increase in the sensitivity to the surface roughness of the bellows. Since the increase in volume here takes place because of the foreign atoms absorbed over the entire cross section, no residual compressive stresses can be formed in the surface layer, which would be advantageous for the service life of the bellows.

Nevertheless, an increase in the service life together with an increase in the pressure resistance is possible, since the influence of the wall thickness has an even greater effect on the service life than on the pressure resistance. By means of a full hardening of the material, the wall thickness, with an increase in the pressure resistance, can still be reduced to the extent that an increase in the service life becomes possible. An especially advantageous secondary effect here is that the spring stiffness of the bellows is reduced due to the reduced wall thickness.

Especially advantageous for the fatigue strength upon achieving a great pressure resistance is the full hardening over the entire wall thickness or even only almost to the core, provided that, in spite of the full hardening, a carbon content decreasing from the edge layer to the core is present. Thus, the compressive stresses advantageous for fatigue strength are retained, and at the same time, a high pressure resistance is achieved.

The hardening of a layer of the bellows proved to be especially advantageous for the service life in experiments, whereby the core of the material remained largely unchanged. Compressive stresses, which have a positive influence on the service life, can form in the edge layer due to the uniform distribution of the foreign atoms. If the hardening depth (measured from the edge up to the hardness that lies 50 HV above the hardness of the base metal) is more than 10% of the material thickness, a marked increase in the pressure resistance as well as a considerable increase in the fatigue strength can already be observed.

Surprisingly a great increase in the fatigue strength under repeated bending stresses arises especially in a thin-walled bellows. Since only the hardened area is exposed to the highest stresses, whereas the stresses in the untreated core are far lower, the plastic area of the material is first reached in case of markedly increased bending deformations. As a result of this, much greater strengths can also be achieved dynamically than only by an elimination of microtears, as it is known from the state of the art. By requiring the highest bending stresses in the absorption of movements of the bellows in the edge layer, strengthening the edge layer with a core remaining ductile is especially advantageous. The causes for this are the compressive stresses generated and the high yield strength of the material in the edge layer.

Due to this increase in the fatigue strength under repeated bending stresses, bellows geometries can be selected, which were up to now less suitable for the absorption of movements, but are highly resistant to pressure.

A pressure-resistant bellows designed according to the present invention with a geometry, in which the corrugation height of the bellows is smaller than the corrugation length, can be especially well optimized in terms of the absorption of movements due to the hardening of the edge layer. The compressive stresses caused by the higher incorporation of carbon in the edge layer area compared to the core increase the fatigue strength of the bellows; thus, it can absorb greater movements with an identical geometry. The pressure resistance is also markedly improved compared to untreated austenitic high-grade steel due to the increased strength of the material.

Connection of bellows to other structural parts usually takes place by means of a weld connection. Hardened, carbon-rich or nitrogen-rich steel can often be welded only with great effort and may also be completely unsuitable for welding depending on the carbon or nitrogen content.

With hardening of a bellows made of austenitic high-grade steel only in the edge layer according to the present invention, the total carbon content lies in an absolutely weldable area. The wall of the bellows is melted during the welding, as a result of which the carbon is distributed in the melt and diluted. A good connection of the outer-layer-hardened bellows is possible due to the low-carbon core area. The weld seam area is then weaker than the adjacent material; however, the weld seam can be placed in a less loaded area.

A further possibility for connecting the bellows, when a weldability shall no longer be given after the carbon diffusion, is to weld connection parts to the bellows already before the treatment. In this case, the connection part usually has a greater wall thickness than the bellows. Thus, the connection part can then be welded with the surrounding area, since the carbon atoms or a plurality of suitable foreign atoms, such as especially nitrogen atoms are distributed to a great deal more material during the melting.

In addition, it is possible to mechanically or chemically remove the hardened edge layer again from the connection piece after the carbon incorporation. Consequently, the connection piece, for its part, can be welded with the surrounding area of the bellows without problems. Such a weld seam is only a seal weld, which only fulfils a sealing function, but does not have to bring about a transmission of force.

A further possible form of the connection of the bellows to its surrounding area is dispensing with the welding process per se. The connection to the surrounding area may be carried out by means of frictional connection or positive locking or bonding, hard or soft soldering.

This process may not only be applied in prior-art cylindrical corrugated bellows. A further variant of a bellows is the diaphragm bellows. This consists, on the one hand, of a plurality of circular rings which are provided with a corrugated profile and are welded to one another on their outer and inner edges in an accordion-like manner. Such a bellows prepared from a plurality of welded diaphragms is especially expedient, the individual bellows diaphragms are already welded to one another by the incorporation process. Thus, the improved properties of the hardened material are no longer impaired by the welding process.

Further advantages and features of the present invention arise from the claims as well as from the following designation in the exemplary embodiments of the present invention and are explained in detail with reference to the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
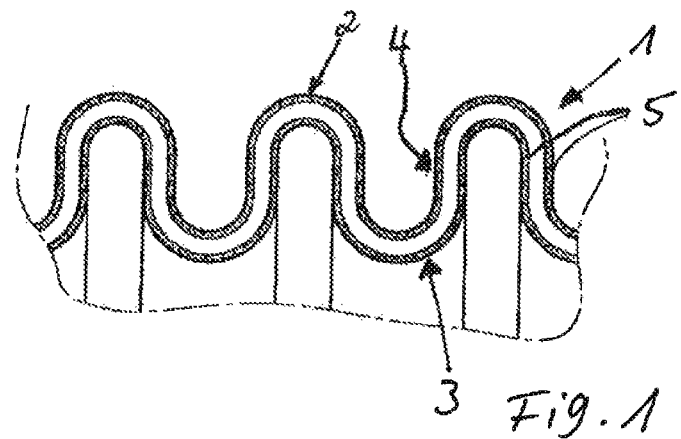
FIG. 1 is a longitudinal sectional view through a part of a usual corrugated bellows with greater corrugation height than corrugation width and with illustration of the hardened edge layers.

Referring to the drawings in particular, a metal bellows 1, as it is shown in a partial longitudinal section in FIG. 1, has corrugations of its wall with corrugation peaks 2, corrugation valleys 3 and corrugation flanks 4 connected with these. In this bellows, the height of the corrugations is greater than their length. During the manufacture, the hardening of the bellows wall takes place in the manner described in the general description from inside and outside in an identical common surrounding area. Only the inner and outer edge layers 5 are hardened in the exemplary embodiment of FIG. 1, as is illustrated in the drawing.

The hardening depth of the edge layer is shown as being approximately 20% of the wall thickness in each case. The depth of the hardened edge layer, in which the hardness of the edge layer lies 50 HV0.01—as measured by means of the Vickers hardness test—above the basic hardness of the base metal, is designated as the hardening depth.

Figure 2:
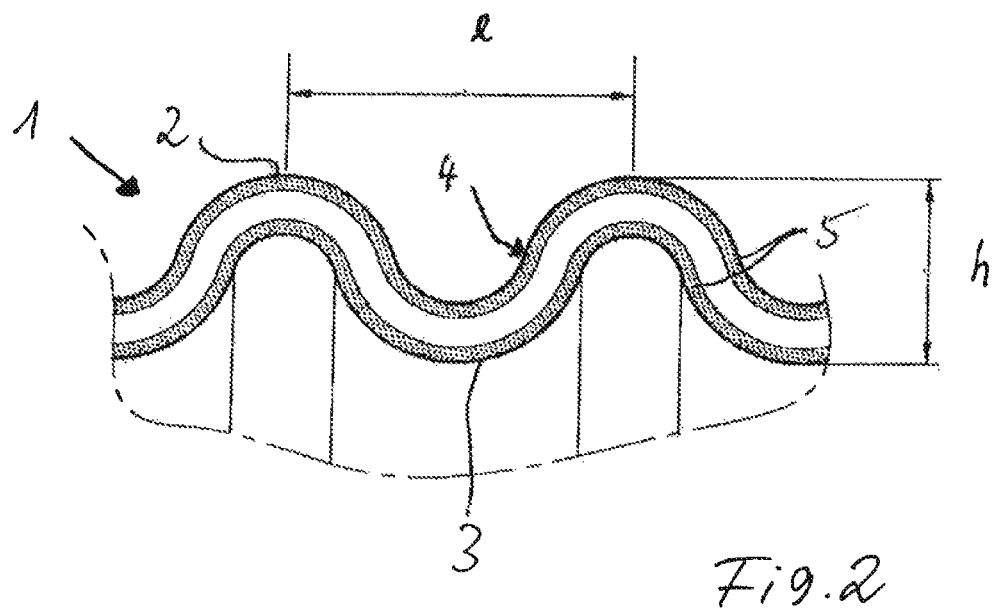
FIG. 2 is a partial longitudinal sectional view through a bellows with greater corrugation width than corrugation height.
Figure 3:
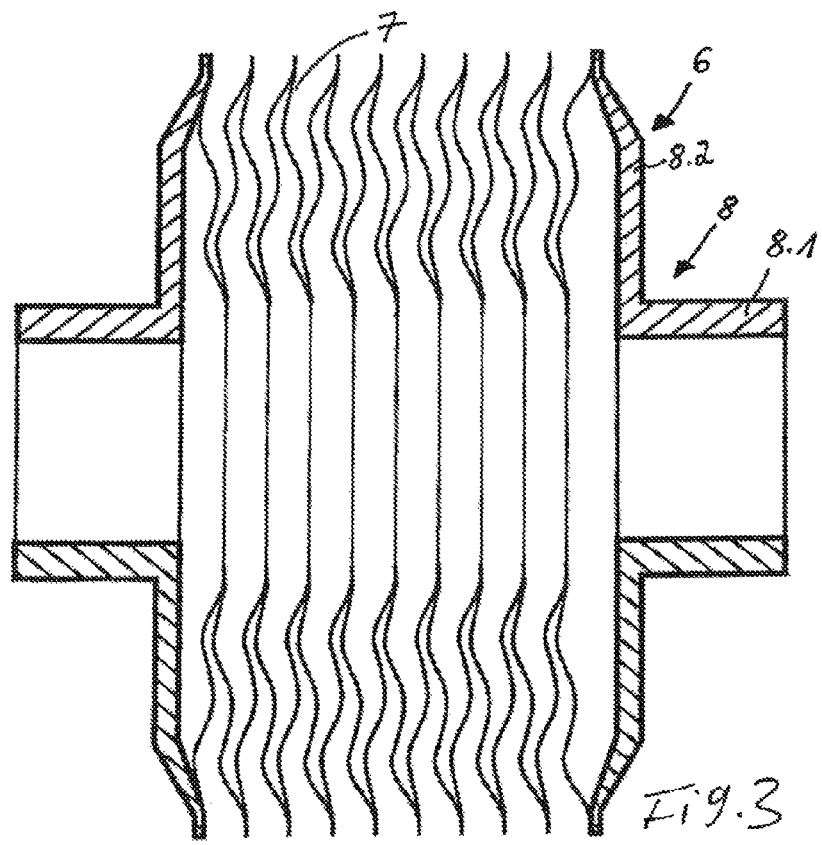
FIG. 3 is a sectional view through a diaphragm bellows.

The same applies to the bellows of FIG. 2, in which the corrugation height h is smaller than the corrugation length l. Otherwise, identical parts are designated by identical reference numbers. Here as well, only the edge layers are hardened in the manner according to the present invention. Such a bellows is preferably used in functional elements such as injection valves. FIG. 3 shows a bellows of a different type, in which the present invention is also applicable. This is a diaphragm bellows 6. This bellows has individual ring-shaped diaphragms 7, which are corrugated flat in their ring area. For creating the bellows 6, a plurality of such corrugated ring diaphragms 7 are connected with one another, especially in substance, by welding, on their outer edges and their inner edges. In addition, connection elements 8 are present, which consist of a connecting branch 8.1 and a flange part 8.2, which is highly contoured in the outer edge area of the connecting branch 8.1 and is connected in the same manner in each case with the outer area of the adjacent diaphragm 7.

Figure 4:
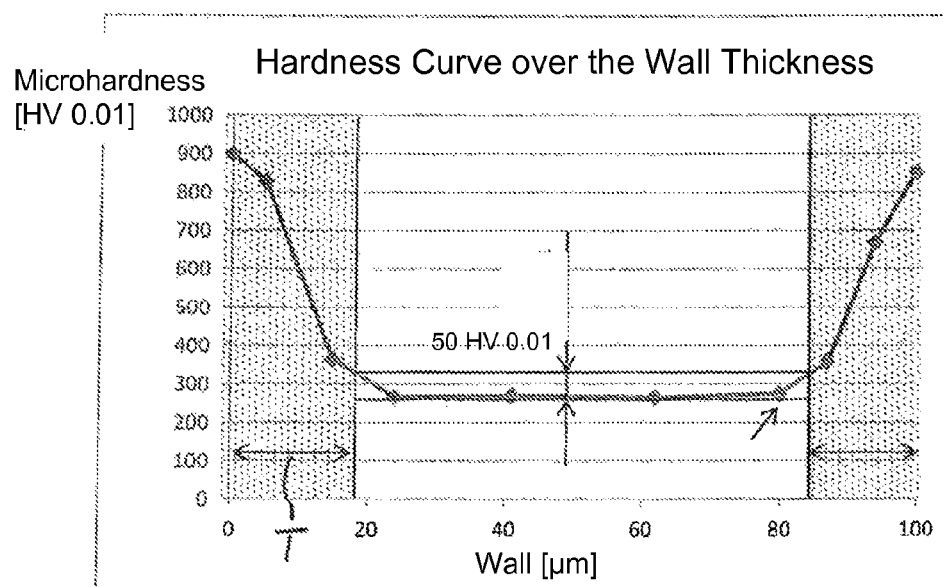
FIG. 4 is a diagram of the hardness curve of a bellows in case of hardening of the edge area of the wall.

FIG. 4 shows a diagram of the hardness curve over the wall thickness in a preferred exemplary embodiment of a bellows 1 hardened only in the edge area 5. The material of the bellows is a steel having a basic hardness of approximately 250 HV0.01—measured by means of Vickers hardness test. The bellows was hardened according to the present invention from inside to outside with a hardening depth T of approximately 20% of the wall thickness in each case. It is shown that the microhardness over approximately 5% of the wall thickness, as measured from the respective surface of the bellows 1, is more than 700 HV0.01 and even above 600 HV0.01 up to a hardening depth of 10% of the wall thickness.

Figure 5:
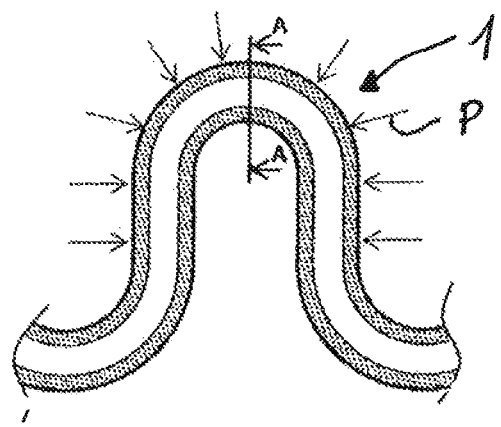
FIG. 5 is a sectional view through a bellows of FIG. 1 in case of pressure application with representation of the action of the compressive stresses.
Figure 6:
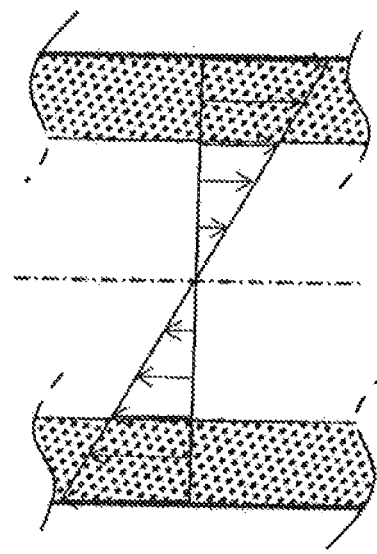
FIG. 6 is a sectional view along line A-A of FIG. 5 through the apex of the bellows corrugation with representation of the stress curve through the bellows wall.

Hence, the hardening takes place with a hardening depth in the edge area, in which the highest stresses occur in case of the application of pressure, as this is illustrated in FIGS. 5 and 6. FIG. 5 shows a corrugation of a pressure-loaded bellows 1, whereby the active application of pressure is shown by arrows P. Such an application of pressure leads to a stress curve, as it is reproduced in section A-A of FIG. 5 shown in FIG. 6, where it is evident that the greatest bending stresses lie in the hardening depth of the edge layer. This stress curve is valid both in case of outer pressure application and in compression of the bellows. The stresses in the untreated core are much lower than in the hardened area or the hardening depth.

Figure 7:
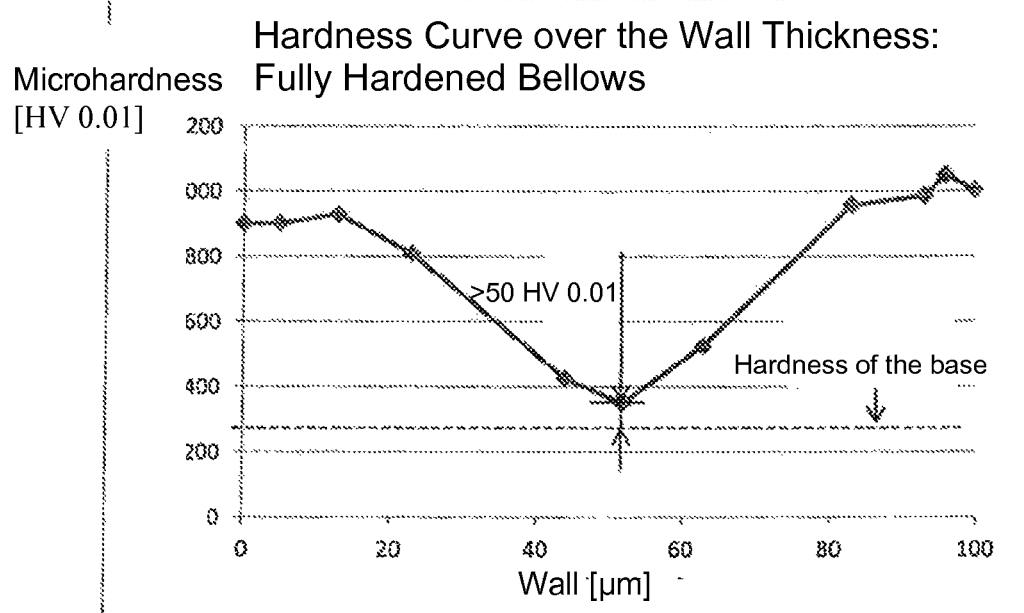
FIG. 7 is a hardness curve over the wall of a fully hardened bellows.

Finally, FIG. 7 shows the hardness curve over the wall thickness of a fully hardened bellows, in which the lowest hardness—approximately in the middle of the wall—is thus 50 HV0.01 above the basic hardness of the material. It is shown here that the microhardness is approximately constant over approximately 10% of the wall thickness because of the hardening according to the present invention and is above 900 HV0.01 and then drops linearly continuously to the middle area.

While specific embodiments of the invention have been shown and described in detail to illustrate the application of the principles of the invention, it will be understood that the invention may be embodied otherwise without departing from such principles.

What is claimed is:

1. A bellows comprising:
   one or more layers made of austenitic high-grade steel, wherein an edge layer is hardened up to a hardening depth of at least 5% of a wall thickness by means of the incorporation at least one of carbon atoms and nitrogen atoms; and
   connections ends, wherein the connection ends of the bellows do not have the at least one of carbon atoms and nitrogen atoms over at least a finite length thereof.

2. A bellows in accordance with claim 1, wherein the at least one of carbon atoms and nitrogen atoms are incorporated in a hardening depth of at least 10% of the wall thickness, but not more than 50 μm.

3. A bellows in accordance with claim 1, wherein the at least one of carbon atoms and nitrogen atoms are incorporated in a hardening depth of at least 25% of the wall thickness, but not more than 100 μm.

4. A bellows in accordance with claim 1, wherein the hardening depth is at least 80% of the wall thickness of the bellows.

5. A bellows in accordance with claim 1, wherein the hardening depth extends over the entire wall thickness of the bellows.

6. A bellows in accordance with claim 1, wherein the content of incorporated at least one of carbon atoms and nitrogen atoms decreases from an outside of the wall of the bellows towards an interior of the wall.

7. A bellows in accordance with claim 1, wherein the hardness of the bellows is at least 600 HV0.01 (measured by means of Vickers hardness test) above the hardening depth.

8. A bellows in accordance with claim 1, wherein a length of the bellows corrugations is greater compared to a height of the bellows corrugations.

9. A bellows in accordance with claim 1, wherein the wall thickness is less than 0.5 mm.

10. A bellows in accordance with claim 1, wherein the bellows comprises welded-on connection pieces which do not have the at least one of carbon and nitrogen atoms over at least a finite length thereof.

11. A bellows in accordance with claim 1, wherein at least one of the connection ends and separately welded-on connection pieces have a reduced thickness, such as by means of chemical or mechanical material removal.

12. A bellows in accordance with claim 1, wherein the wall thickness is more than 0.25 mm and less than 0.5 mm.

13. A bellows comprising:
   a bellows structure comprising a layer of austenitic high-grade steel, said layer comprising an edge layer, said edge layer being hardened up to a hardening depth of at least 5% of a wall thickness by means of incorporation at least one of carbon atoms and nitrogen atoms, said bellows structure comprising connection ends, each of said connection ends having a length, said length being free of the at least one of carbon atoms and nitrogen atoms.

14. A bellows in accordance with claim 13, wherein said at least one of carbon atoms and nitrogen atoms are incorporated in a hardening depth of at least 10% of the wall thickness, but not more than 50 μm.

15. A bellows in accordance with claim 13, wherein said at least one of carbon atoms and nitrogen atoms are incorporated in a hardening depth of at least 25% of the wall thickness, but not more than 100 μm.

16. A bellows in accordance with claim 13, wherein the content of incorporated at least one of carbon atoms and nitrogen atoms decreases from an outside of a wall of the bellows structure towards an interior of the wall.

17. A bellows comprising:
   a layer of austenitic high-grade steel, said layer comprising an edge layer, said edge layer being hardened up to a hardening depth of at least 5% of a wall thickness by means of incorporation at least one of carbon atoms and nitrogen atoms, said layer of austenitic high-grade steel defining at least a portion of bellows connection ends, each of said bellows connection ends having a length, said length being free of the at least one of carbon atoms and nitrogen atoms.

18. A bellows in accordance with claim 17, wherein said at least one of carbon atoms and nitrogen atoms are incorporated in a hardening depth of at least 10% of the wall thickness, but not more than 50 μm.

19. A bellows in accordance with claim 17, wherein said at least one of carbon atoms and nitrogen atoms are incorporated in a hardening depth of at least 25% of the wall thickness, but not more than 100 μm.

20. A bellows in accordance with claim 17, wherein the layer of austenitic high-grade steel defines at least a portion of a bellows wall, wherein the content of incorporated at least one of carbon atoms and nitrogen atoms decreases from an outside of the bellows wall towards an interior of the bellows wall.

* * * * *